United States Patent
Jeong et al.

(10) Patent No.: US 8,991,463 B2
(45) Date of Patent: Mar. 31, 2015

(54) FILM PEELING APPARATUS AND FILM PEELING METHOD USING THE SAME

(71) Applicants: Il-Young Jeong, Yongin (KR);
Gyoo-Wan Han, Yongin (KR);
Jeong-Hun Woo, Yongin (KR)

(72) Inventors: Il-Young Jeong, Yongin (KR);
Gyoo-Wan Han, Yongin (KR);
Jeong-Hun Woo, Yongin (KR)

(73) Assignee: Samsung Display Co., Ltd.,
Yongin-City, Gyunggi-Do (KR)

( * ) Notice: Subject to any disclaimer, the term of this patent is extended or adjusted under 35 U.S.C. 154(b) by 0 days.

(21) Appl. No.: 13/760,228

(22) Filed: Feb. 6, 2013

(65) Prior Publication Data

US 2014/0060748 A1    Mar. 6, 2014

(30) Foreign Application Priority Data

Sep. 4, 2012 (KR) .......................... 10-2012-0097868

(51) Int. Cl.
 *B32B 38/10*  (2006.01)
 *B32B 43/00*  (2006.01)
 *B29C 63/00*  (2006.01)

(52) U.S. Cl.
CPC ......... *B32B 43/006* (2013.01); *Y10T 156/1944* (2013.01); *Y10T 156/1132* (2013.01); *Y10T 156/11* (2013.01); *Y10T 156/195* (2013.01); *B29C 63/0013* (2013.01); *B32B 2457/20* (2013.01)
USPC ........... 156/759; 156/715; 156/716; 156/718; 156/763; 156/765

(58) Field of Classification Search
None
See application file for complete search history.

(56) References Cited

U.S. PATENT DOCUMENTS

| | | | | |
|---|---|---|---|---|
| 2,605,196 A * | 7/1952 | Bostwick | ...... | 156/395 |
| 4,636,276 A * | 1/1987 | Nozaka | ...... | 156/353 |
| 4,867,837 A * | 9/1989 | Seki et al. | ...... | 156/754 |
| 5,312,505 A * | 5/1994 | Sumi et al. | ...... | 156/751 |
| 5,540,809 A * | 7/1996 | Ida et al. | ...... | 156/760 |
| 5,843,276 A * | 12/1998 | Watanabe | ...... | 156/759 |
| 6,767,426 B1 * | 7/2004 | Yamamoto | ...... | 156/270 |
| 6,966,966 B2 * | 11/2005 | Koizumi et al. | ...... | 156/751 |
| 8,029,642 B2 * | 10/2011 | Hagman | ...... | 156/715 |
| 8,171,977 B2 * | 5/2012 | Kobayashi | ...... | 156/760 |
| 2002/0094760 A1 * | 7/2002 | Lim | ...... | 451/41 |
| 2006/0191633 A1 * | 8/2006 | Hayasaka | ...... | 156/344 |
| 2007/0151667 A1 * | 7/2007 | Tani et al. | ...... | 156/344 |
| 2007/0235131 A1 * | 10/2007 | Tsujimoto et al. | ...... | 156/344 |
| 2009/0065144 A1 * | 3/2009 | Yamamoto et al. | ...... | 156/344 |
| 2009/0097892 A1 * | 4/2009 | Murakami et al. | ...... | 399/349 |
| 2009/0188623 A1 * | 7/2009 | Gordon et al. | ...... | 156/344 |
| 2009/0288760 A1 * | 11/2009 | Garben | ...... | 156/230 |
| 2010/0181019 A1 * | 7/2010 | Kino et al. | ...... | 156/247 |
| 2012/0018099 A1 * | 1/2012 | Mc Cowin | ...... | 156/759 |

FOREIGN PATENT DOCUMENTS

| | | |
|---|---|---|
| JP | 2008-280157 A | 11/2008 |
| JP | 2011-077098 A | 4/2011 |
| KR | 10 2006-01094 A | 10/2006 |

* cited by examiner

*Primary Examiner* — Mark A Osele
*Assistant Examiner* — Nickolas Harm
(74) *Attorney, Agent, or Firm* — Lee & Morse, P.C.

(57) ABSTRACT

A film peeling apparatus includes a peeling pin that push-lifts a first end portion of a cut portion of a film toward a second end portion of the cut portion, a peeling roller that push-lifts the second end portion of the cut portion toward the first end portion of the cut portion by closely contacting the second end portion of the cut portion and rotating, and an absorbing unit that absorbs and removes the cut portion of the film push-lifted by the peeling pin and peeling roller.

18 Claims, 4 Drawing Sheets

FILM PEELING APPARATUS AND FILM PEELING METHOD USING THE SAME

CROSS-REFERENCE TO RELATED PATENT APPLICATION

This application claims the benefit under 35 U.S.C. §119 of Korean Patent Application No. 10-2012-0097868, filed on Sep. 4, 2012, in the Korean Intellectual Property Office, the disclosure of which is incorporated herein in its entirety by reference.

BACKGROUND

1. Field

Embodiments relate to a film peeling apparatus and a film peeling method using the same, and more particularly, to a film peeling apparatus that may be used for peeling a portion of a film attached to a panel, such as a protective film for a flat panel display apparatus, and a film peeling method using the same.

2. Description of the Related Art

For example, a protective film for protecting a panel is attached to a flat panel display apparatus, such as an organic light emitting display apparatus or a liquid crystal display apparatus.

The protective film is attached on the front surface of the panel in which an unnecessary portion of the film is cut and peeled off.

SUMMARY

Embodiments are directed to a film peeling apparatus including a peeling pin that push-lifts a first end portion of a cut portion of a film toward a second end portion of the cut portion, a peeling roller that push-lifts the second end portion of the cut portion toward the first end portion of the cut portion by closely contacting the second end portion of the cut portion and rotating, and an absorbing unit that absorbs and removes the cut portion of the film push-lifted by the peeling pin and peeling roller.

The film peeling apparatus may further include a gap probe that measures a distance between a panel on which the film is located and the film peeling apparatus and that determines whether the cut portion is properly removed based on the measured distance.

The absorbing unit may include an absorbing nozzle that contacts the cut portion, a vacuum pump that applies an absorbing force to the absorbing nozzle, an absorbing tube that interconnects the absorbing nozzle and the vacuum pump, and a scrap case, into which the cut portion is introduced via the absorbing tube and in which the introduced cut portion is housed.

The peeling pin may be made of a plastic material or a metal.

The peeling pin may be made of a plastic material that includes a polyether ether ketone (PEEK).

The peeling pin may be made of a metal that includes a stainless steel.

The peeling roller may be made of a plastic material.

The plastic material may include a polyether ether ketone (PEEK).

Embodiments are also directed to a film peeling method including push-lifting a first end portion of a cut portion of a film toward a second end portion of the cut portion by using a peeling pin, push-lifting the second end portion of the cut portion toward the first end portion of the cut portion by bringing a peeling roller into close contact with the second end portion of the cut portion and rotating the peeling roller, and absorbing and removing the push-lifted portion by using an absorbing unit.

The film peeling method may further include measuring a distance between a panel on which the film is located and the film peeling apparatus by using a gap probe and determining whether the cut portion is properly removed based on the measured distance.

The absorbing unit may include an absorbing nozzle that contacts the cut portion, a vacuum pump that applies absorbing force to the absorbing nozzle, an absorbing tube that interconnects the absorbing nozzle and the vacuum pump, and a scrap case, into which the cut portion is introduced via the absorbing tube and in which the introduced cut portion is housed.

The peeling pin may be made of a plastic material or a metal.

The peeling pin may be made of a plastic material that includes a polyether ether ketone (PEEK).

The peeling pin may be made of a metal that includes a stainless steel.

The peeling roller may be made of a plastic material.

The plastic material may include a polyether ether ketone (PEEK).

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
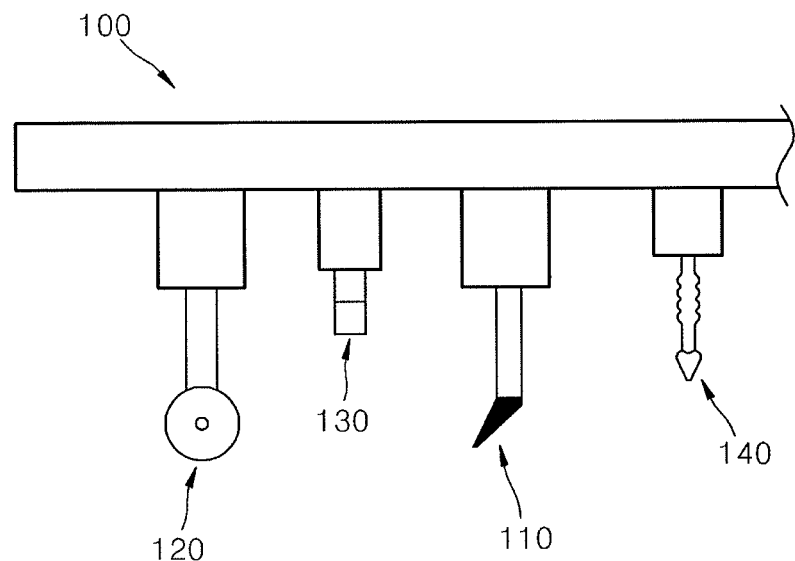
FIG. 1 is a schematic diagram showing a film peeling apparatus according to an embodiment.

FIG. 1 is a schematic diagram showing a film peeling apparatus 100 according to an embodiment.

As shown in FIG. 1, the film peeling apparatus 100 according to the present embodiment includes a peeling pin 110 and a peeling roller 120 for push-lifting two opposite ends of a cut portion of a film, an absorbing unit 130 for absorbing and removing the push-lifted cut portion of the film, and a gap probe 140 for determining whether the cut portion is removed.

The peeling pin 110, the peeling roller 120, the absorbing unit 130, and the gap probe 140 may move vertically to approach toward and recede from a target object, which is an object from which a film is to be peeled off, and may also move horizontally with respect to the target object. Any suitable mechanism for guiding vertical and horizontal movements of the components may be used.

Figure 2:
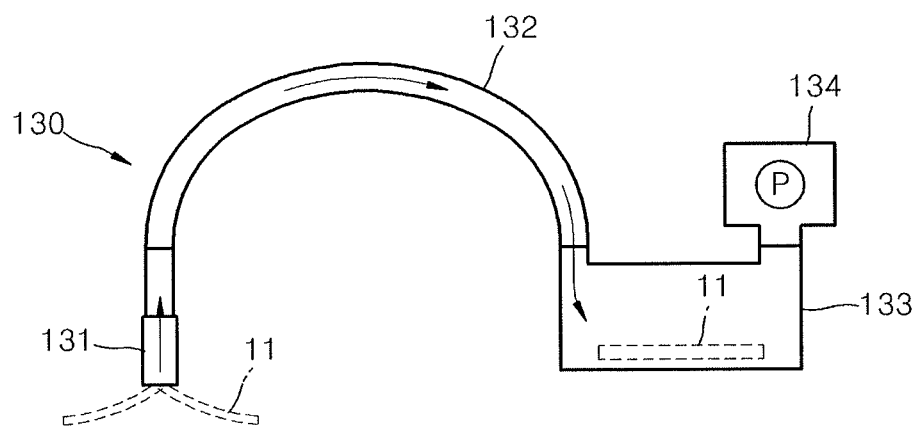
FIG. 2 is a diagram showing a configuration of an absorbing unit in the film peeling apparatus shown in FIG. 1.

Furthermore, as shown in FIG. 2, the absorbing unit 130 has a structure in which an absorbing nozzle 131, an absorbing tube 132, a vacuum pump 134, and a scrap case 133 are connected. Therefore, when the vacuum pump 134 operates and an absorbing force is applied to the absorbing nozzle 131, the cut portion 11 of a film is absorbed by the absorbing force, and the absorbed cut portion 11 moves along the absorbing tube 132 and is housed in the scrap case 133.

Figure 3A:
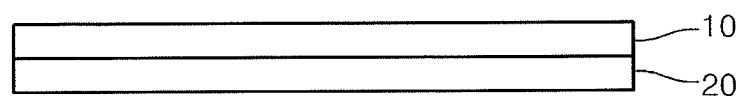
FIGS. 3A through 3G are diagrams sequentially showing stages of a film peeling process using the film peeling apparatus shown in FIG. 1.
Figure 3B:
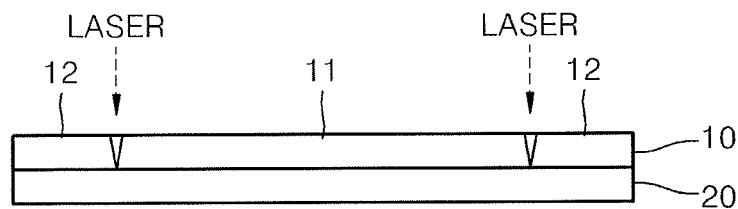

The film peeling apparatus 100 having the configuration as described above removes the cut portion 11 of a protective film 10 as shown in FIGS. 3A and 3B.

The protective film 10 may be attached to a panel 20 of a flat panel display apparatus as shown in FIG. 3A. The protective film 10 may be attached to the front surface of the panel 20, and an unnecessary portion of the protective film 10 may be cut by irradiating a laser beam as shown in FIG. 3B. As a result, a gap is formed between the cut portion 11 to be removed and a remaining portion 12 to be remained on the panel 20, and the two regions 11 and 12 are separated by the gap.

Next, to detach the cut portion 11 from the panel, The film peeling apparatus 100 according to the present embodiment is operated.

Figure 3C:
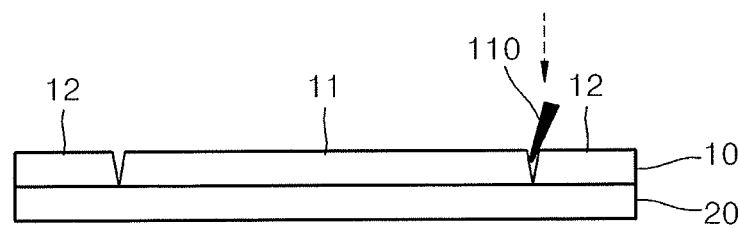

As shown in FIG. 3C, the peeling pin 110 is moved down and is inserted to the gap between the two regions 11 and 12. The peeling pin 110 may not necessarily be inserted to the gap and may press a first end portion of the cut portion 11.

Figure 3D:
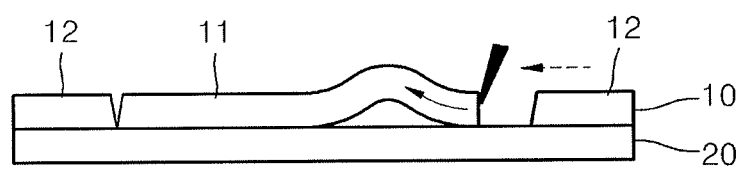

The peeling pin 110 is moved toward a second end portion of the cut portion 11, and thus the first end portion of the cut portion 11 is slightly push-lifted toward the second end portion of the cut portion 11, as shown in FIG. 3D.

Figure 3E:
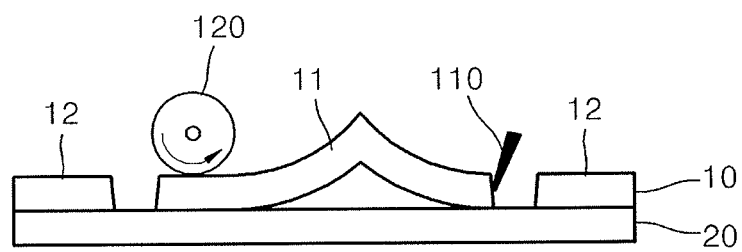

As shown in FIG. 3E, the peeling roller 120 is moved down, and is brought into close contact with the second end portion of the cut portion 11. The peeling roller 120 is rotated, such that the second end portion of the cut portion 11 is push-lifted toward the first end portion of the cut portion 11. As a result, the two opposite end portions of the cut portion 11 are push-lifted toward the center of the cut portion 11 by the peeling pin 110 and the peeling roller 120, thereby forming a mountain-like push-lifted portion at the center portion of the cut portion 11.

Figure 3F:
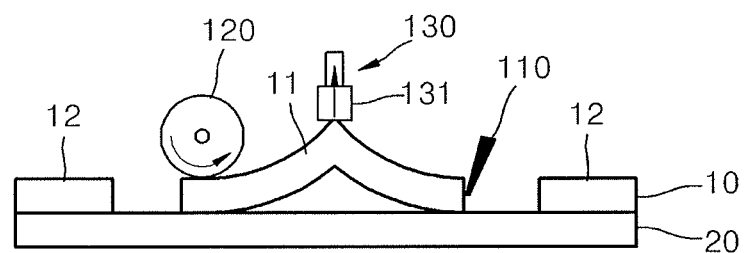
Figure 3G:
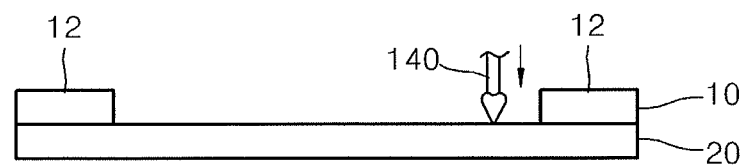

Next, the absorbing nozzle 131 of the absorbing unit 130 is moved down to suck up the push-lifted portion of the cut portion 11 as shown in FIG. 3F. As a result, the cut portion 11 is absorbed via the absorbing tube 132 by the absorbing force applied to the absorbing nozzle 131 and is housed in the scrap case 133, as described above with reference to FIG. 2. The absorbing force applied to the absorbing nozzle 131 may be limited to not exceed 600 mmHg. If the absorbing force is too strong, the cut portion 11 may not be detached clean and may be broken. Furthermore, a length of the absorbing tube 132 from the absorbing nozzle 131 to the scrap case 133 may be limited to not exceed 2 m. If the length of the absorbing tube 132 is too long, the cut portion 11 may be stuck in the absorbing tube 132, for example.

After the cut portion 11 is removed, the gap probe 140 is moved down and measures a distance between the panel 20 and the film peeling apparatus 100, determines whether the cut portion 11 is properly removed based on the measured distance, and notifies a result of the determination to a user.

As described above, the two opposite end portions of the cut portion 11 of the protective film 10 are push-lifted by the peeling pin 110 and the peeling roller 120 and the push-lifted portion is absorbed and removed by the absorbing unit 130. Accordingly, the protective film 10 may be precisely and stably peeled off regardless of a material constituting the protective film 10 unlike a method using an adhesive tape.

To reduce the possibility of and/or prevent static electricity from being produced due to friction while the cut portion 11 of the protective film 10 is being push-lifted, the peeling pin 110 and the peeling roller 120 may be formed of materials including plastic materials. For example, the peeling pin 110 and the peeling roller 120 may be formed of a durable and electrically safe material, such as polyether ether ketone (PEEK).

In other implementations, to reduce the possibility of and/or prevent the panel 20 below the protective film 10 from being damaged, the peeling pin 110 may be formed of an elastic metal piece. For example, when a peeling pin 110 that is formed of a thin stainless steel plate is inserted into the gap between the cut portion 11 and the remaining portion 12, even if a leading end portion of the peeling pin 110 contacts the panel 20, the peeling pin 110 may be elastically bent. Accordingly, the risk of damaging the panel 20 may be reduced.

The peeling roller 120, on the other hand, is a component for closely contacting the cut portion 11. Accordingly, the peeling roller 120 may be formed of a plastic material. The peeling pin 110 may be selectively formed of the same plastic material for reducing the possibility of and/or preventing static electricity or of a metal for preventing damages to the panel 20.

By way of summation and review, if an operation for peeling off an unnecessary portion of a film is not smoothly performed, the overall productivity may be deteriorated. For example, if a cut film is peeled off by attaching an adhesive tape to an end portion of the cut film and peeling off the cut film using the adhesive tape, the film may not be peeled off smoothly, depending on the adhesiveness of the adhesive tape with respect to the film material, which may vary according to film materials. Therefore, an apparatus for stably and smoothly performing such a film peeling operation is desirable.

Embodiments provide an enhanced film peeling apparatus for performing a precise and stable film peeling operation and a film peeling method using the same. An operation for removing an unnecessary portion of a film may be stably and smoothly performed by using the film peeling apparatus as described above, and thus the overall productivity may be improved.

While embodiments have been particularly shown and described with reference to exemplary embodiments thereof, it will be understood by those of ordinary skill in the art that various changes in form and details may be made therein without departing from the spirit and scope thereof, as defined by the following claims.

What is claimed is:

1. A film peeling apparatus, comprising:
   a peeling pin that push-lifts a first end portion of a cut portion of a film toward a second end portion of the cut portion;
   a peeling roller that push-lifts the second end portion of the cut portion toward the first end portion of the cut portion by closely contacting the second end portion of the cut portion and rotating; and
   an absorbing unit that absorbs and removes the cut portion of the film push-lifted by the peeling pin and peeling roller.

2. The film peeling apparatus of claim 1, further comprising a gap probe that measures a distance between a panel on which the film is located and the film peeling apparatus and that determines whether the cut portion is properly removed based on the measured distance.

3. The film peeling apparatus of claim 1, wherein the absorbing unit includes:
   an absorbing nozzle that contacts the cut portion;
   a vacuum pump that applies an absorbing force to the absorbing nozzle;
   an absorbing tube that interconnects the absorbing nozzle and the vacuum pump; and
   a scrap case, into which the cut portion is introduced via the absorbing tube and in which the introduced cut portion is housed.

4. The film peeling apparatus of claim 1, wherein the peeling pin is made of a plastic material or a metal.

5. The film peeling apparatus of claim 4, wherein the peeling pin is made of a plastic material that includes a polyether ether ketone.

6. The film peeling apparatus of claim 4, wherein the peeling pin is made of a metal that includes a stainless steel.

7. The film peeling apparatus of claim 1, wherein the peeling roller is made of a plastic material.

8. The film peeling apparatus of claim 7, wherein the plastic material includes a polyether ether ketone.

9. The film peeling apparatus of claim 1, wherein the peeling pin is insertable into a gap between the first end portion of the cut portion and a remaining portion of the film in order to push-lift the first end portion of the cut portion toward the second end portion of the cut portion.

10. The film peeling apparatus of claim 1, wherein the peeling pin and peeling roller are configured to push-lift opposite end portions of the cut portion toward a center of the cut portion so as to form a mountain-like push-lifted portion at the center of the cut portion.

11. A film peeling method, comprising:
    push-lifting a first end portion of a cut portion of a film toward a second end portion of the cut portion by using a peeling pin;
    push-lifting the second end portion of the cut portion toward the first end portion of the cut portion by bringing a peeling roller into close contact with the second end portion of the cut portion and rotating the peeling roller; and
    absorbing and removing the push-lifted portion by using an absorbing unit.

12. The film peeling method of claim 11, further comprising measuring a distance between a panel on which the film is located and the film peeling apparatus by using a gap probe and determining whether the cut portion is properly removed based on the measured distance.

13. The film peeling method of claim 11, wherein the absorbing unit includes:
    an absorbing nozzle that contacts the cut portion;
    a vacuum pump that applies absorbing force to the absorbing nozzle;
    an absorbing tube that interconnects the absorbing nozzle and the vacuum pump; and
    a scrap case, into which the cut portion is introduced via the absorbing tube and in which the introduced cut portion is housed.

14. The film peeling method of claim 11, wherein the peeling pin is made of a plastic material or a metal.

15. The film peeling method of claim 14, wherein the peeling pin is made of a plastic material that includes a polyether ether ketone.

16. The film peeling method of claim 14, wherein the peeling pin is made of a metal that includes a stainless steel.

17. The film peeling method of claim 11, wherein the peeling roller is made of a plastic material.

18. The film peeling method of claim 17, wherein the plastic material includes a polyether ether ketone.

* * * * *